United States Patent [19]
Bertin et al.

[11] 4,042,060
[45] Aug. 16, 1977

[54] AIR-LIFT VEHICLES

[75] Inventors: Jean Henri Bertin, Neuilly S. Seine; Paul Guienne, La Celle St. Cloud; Andre Lafont, Paris, all of France

[73] Assignees: Bertin & Cie, Plaisir; Societe D'Etudes et de Developpement des Aeroglisseurs Marins, Terrestrea et Amphibies S.E.D.A.M., Paris, both of France

[21] Appl. No.: 598,530

[22] Filed: July 23, 1975

[30] Foreign Application Priority Data
Aug. 5, 1974 France .................. 74.27139

[51] Int. Cl.² .................. B60V 1/16
[52] U.S. Cl. .................. 180/127; 180/121
[58] Field of Search .......... 180/121, 127, 128, 117

[56] References Cited
U.S. PATENT DOCUMENTS

| 3,365,018 | 1/1968 | Bliss | 180/127 X |
| 3,382,945 | 5/1968 | Bertin et al. | 180/127 X |
| 3,513,933 | 5/1970 | Faure | 180/127 X |
| 3,680,657 | 8/1972 | Marchetti et al. | 180/121 |
| 3,811,527 | 5/1974 | Pont et al. | 180/121 |

FOREIGN PATENT DOCUMENTS

| A80,047 | 1/1963 | France | 180/121 |

Primary Examiner—Joseph F. Peters, Jr.
Assistant Examiner—Terrance L. Siemens
Attorney, Agent, or Firm—Alan H. Levine

[57] ABSTRACT

An air-lift vehicle has inner and outer multi-lobed peripheral skirts arranged so that the corresponding lobes of the skirts are in register. Means is provided to supply compressed air to the inside of the inner skirt and between the inner and outer skirts for lifting purposes. The space between the skirts comprises a plurality of compartments each defined by two corresponding lobes of the inner and outer skirts. The lower edges of the lobes of the outer skirt at least are located in the same horizontal plane as a result of which the height of lift and the stability of the vehicle are improved.

4 Claims, 11 Drawing Figures

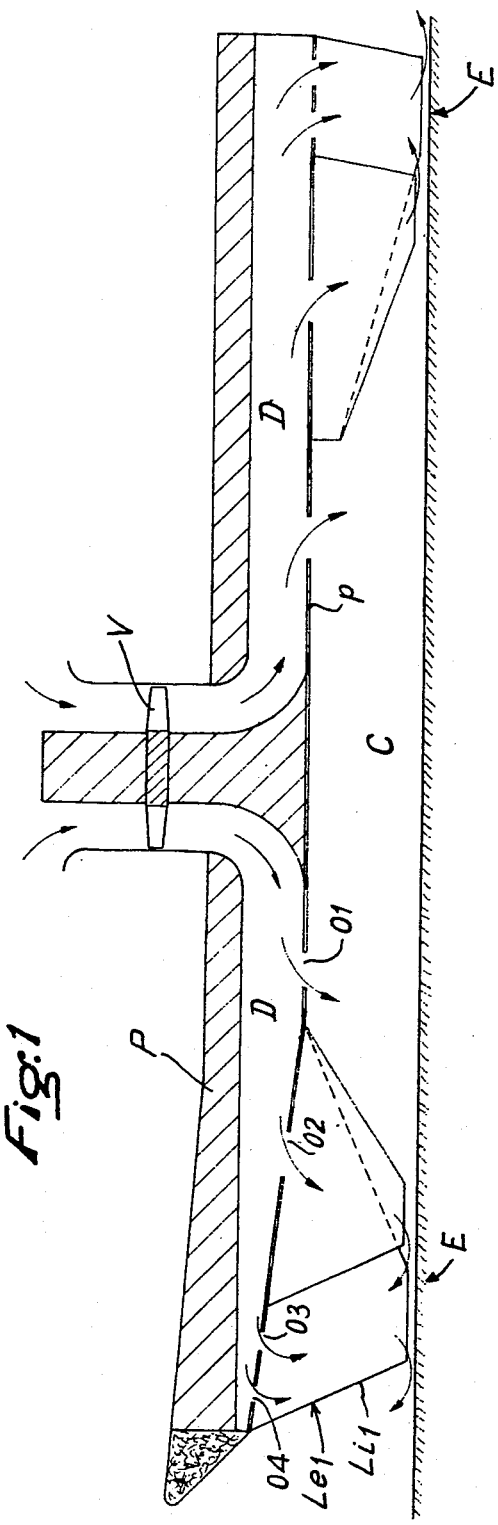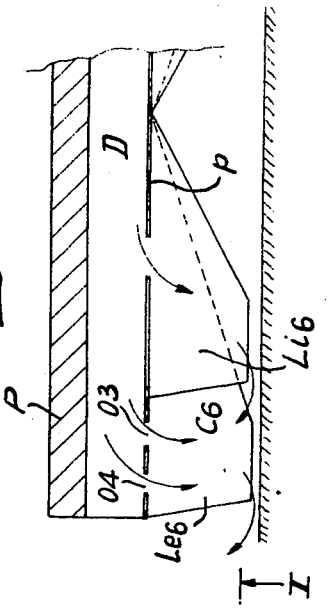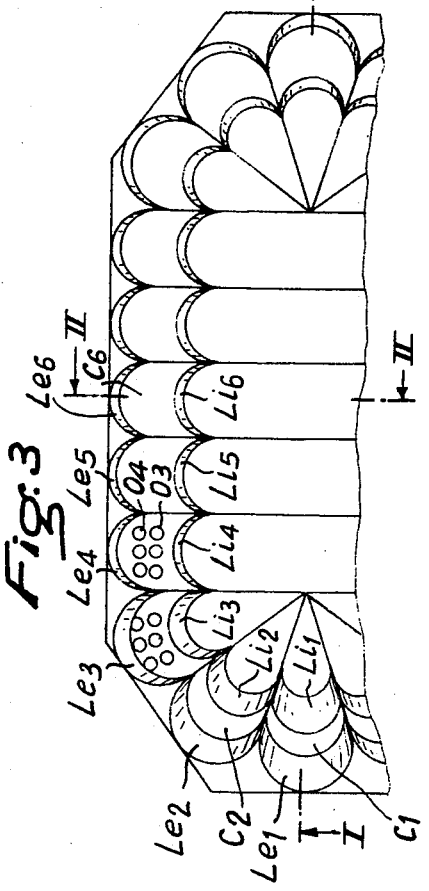

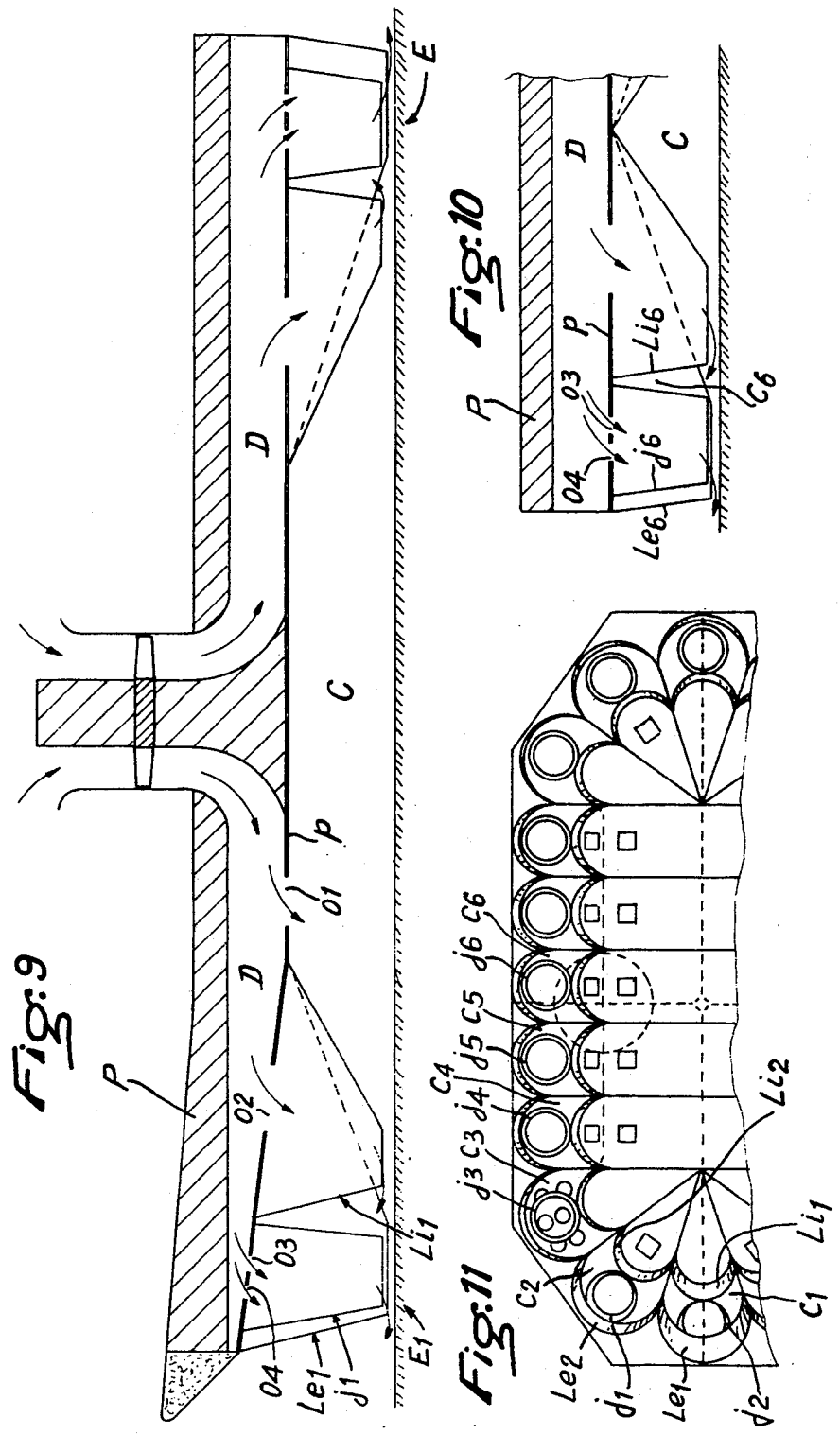

AIR-LIFT VEHICLES

The present invention relates to air-lift vehicles.

More precisely, the invention relates to air-lift vehicles comprising a platform whose lift is ensured by a central lift arrangement of large dimensions surrounded by a peripheral lift arrangement divided into compartments. In such vehicles, the central arrangement is generally defined by an inner peripheral skirt, whereas the peripheral arrangement comprises a number of skirts and/or compartments disposed between the inner peripheral skirt and an outer peripheral skirt. The central and peripheral arrangements are generally supplied simultaneously with air from a central diffusion chamber.

It has been proposed to give the peripheral skirt a multi-lobed shape such that it is constituted by at least two adjacent lobes. Such a skirt is described and illustrated for example (reference 11) in French Patent Of Addition No. 80,047.

By applying the concept of a multi-lobed skirt to aforesaid vehicles the systems described in French Pat. No. 1,599,638 (corresponding to U.S. Pat. No. 3,680,657) are obtained, in which the central arrangement as well as the peripheral arrangement are defined firstly by an internal skirt constituted by a plurality of adjacent lobes and secondly by an outer skirt also constituted by a series of adjacent lobes corresponding to those of the inner skirt, two similar lobes of the inner skirt and outer skirt defining a compartment constituting an individual compartment of the peripheral arrangement. In the prior art and as can be seen more clearly in FIGS. 1, 2, 3 and 4 of French Pat. No. 1,599,638, the shape of each of the lobes is such that there is a progressive variation of the distance from the ground (or from the surface of water in the case of vehicles travelling on water) of the lower edge of each lobe. In other words, the lower edge of each lobe does not extend in a horizontal plane, but rises progressively from the outside to the inside of the vehicle. FIG. 1 of the aforesaid Patent for example shows that the outermost points of the lower edge of the skirts (2a, 4a) are nearest the ground, whereas the edge segments $D_3$ rise progressively.

The result of this arrangement is that the gap for the escape of air at the bottom of each lobe is not constant, the lower edge of the lobes being nearer the ground at the outside than at the inside of the peripheral arrangement. Thus, the height of lift of the vehicle is limited. In fact, for a given rate of flow of air, which flows towards the outside at the bottom of the outer peripheral skirt, the height of lift corresponding to the shortest distance separating the lower edge of the lobes from the ground is smaller the more inclined are the lower edges of the lobes with respect to the ground.

This limitation in the height of lift constitutes a drawback since the height of lift constitutes the preponderant parameter in the capacity of a vehicle to manoeuvre on very irregular ground or on the surface of water disturbed by waves of greater or lesser height. In the same respect, non-uniformity of the distance from the ground of the lower edge of the lobes causes increased risks of local damage and friction.

Finally, the non-uniform character of the height for the escape of air at the bottom of the lobes promotes transverse circulation of air from one peripheral compartment to the adjacent compartment, in particular through the intermediary of regions of greater height for the escape of air. As will be seen hereafter, such a facility for transverse communication constitutes a drawback as regards the efficiency of controlling the stable position of the vehicle.

It is an object of the present invention to obviate or mitigate these drawbacks.

According to the present invention there is provided an air-lift vehicle comprising an inner multi-lobed peripheral skirt and an outer multi-lobed peripheral skirt corresponding lobe for lobe and defining central and peripheral lift arrangements adapted to be supplied simultaneously with compressed air, the central arrangement being defined by the inner peripheral skirt, and the peripheral arrangement comprising a plurality of compartments each defined by two corresponding lobes of the inner skirt and outer skirt, the lower edges of the lobes of the outer skirt being located in the same horizontal plane.

The inclination of the outermost generatrix of each lobe is, preferably, chosen depending on the location of this lobe on the vehicle.

Embodiments of the present invention will now be described, by way of example, with reference to the accompanying drawings, in which:

FIG. 1 is a longitudinal axial section on the line I—I of FIG. 3 of a vehicle having multilobed skirts of general elongated shape;

FIG. 2 is a cross-section of the vehicle on line II—II of FIG. 3;

FIG. 3 is a fragmentary diagrammatic underneath view of the vehicle showing the location of its skirts;

FIGS. 9, 10 and 11 illustrate a second embodiment of a vehicle according to the invention, these Figures being similar to FIGS, 1, 2 and 3 respectively.

The vehicle illustrated in FIGS. 1, 2 and 3 comprises a platform P supported by air cushions defined by skirts known per se. A central blower V supplies a diffusion chamber D arranged below the platform P with air under pressure. The chamber D is defined, on the one hand, by the platform P and on the other hand by a lower wall $p$. Through orifices $o_1$, $o_2$, $o_3$, $o_4$, air from the diffusion chamber D is supplied firstly to a central cushion C and secondly to a peripheral arrangement E. It is possible to partition the chamber D to improve the independent air supply to the various compartments of the peripheral arrangement.

The central cushion C is defined by an inner skirt constituted in a manner which is generally known per se, by a plurality of adjacent tangential inner lobes $L_{i1}$, $L_{i2}$, $L_{i3}$, $L_{i4}$, etc . . . .

The peripheral arrangement E is defined on the inside by the inner skirt and on the outside by an outer skirt constituted by a plurality of adjacent lobes $L_{e1}$, $L_{e2}$, etc . . . .

Each lobe has a substantially arcuate shape obtained by folding a blank as in French Pat. No. 1,599,638. Internally, the lobes terminate in substantially triangular flat sections. Adjacent lobes are tangential along such sections.

The lobes of the inner and outer skirts are paired, their respective sides terminating in flat tangential sections. The pairs of similar lobes ($L_{i1} - L_{e1}$; $L_{i2} - L_{e2}$; ....) thus define separate compartments ($c_1$, $c_2$, $c_3$, $c_4$, etc...) of crescent shape.

The drawings show how the various compartments are supplied with air from the diffusion chamber D through the orifices in the wall $p$, such as $o_1$, $o_2$, $o_3$, $o_4$.

It should be noted that, as regards the simultaneous supply of pressurised air to the central cushion C and peripheral arrangement E, the vehicle according to the present invention is very similar to that described in U.S. Pat. No. 3,811,527 and as regards the arrangement of the multi-lobes skirts, very similar to what is described in French Pat. No. 1,599,638.

The particular feature of the invention resides in the shape of the lower edge of the lobes of the inner skirt and outer skirt.

Figure 4:
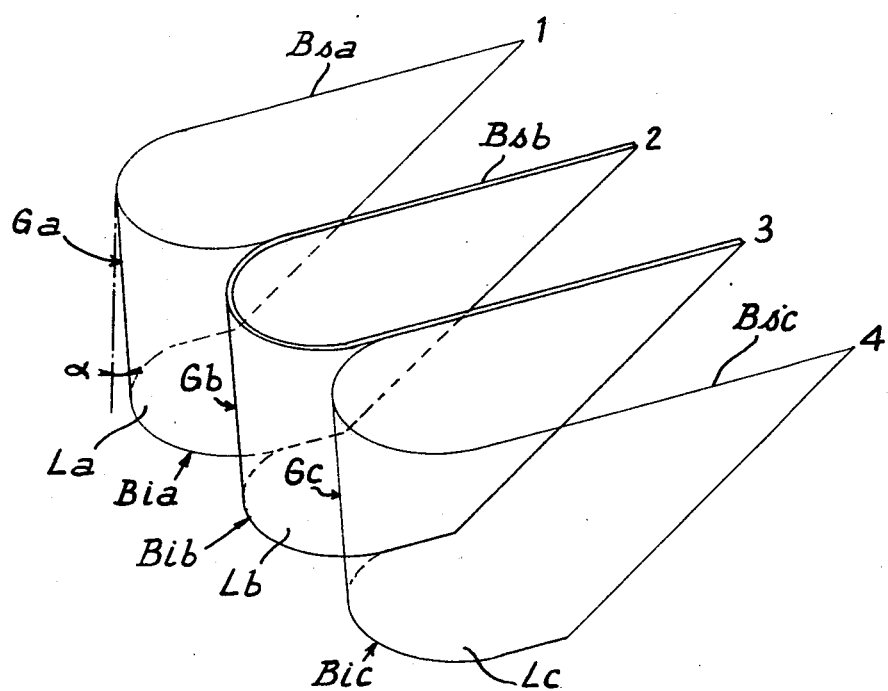
FIG. 4 shows diagrammatically in perspective view, three lobes of a multilobed skirt according to the invention.

FIG. 4 shows three adjacent lobes $L_A$, $L_b$, $L_c$, which may belong to the inner skirt or outer skirt. According to the essential feature of the invention, the lower edges $B_{ia}$, $B_{ib}$, $B_{ic}$, extend in a horizontal plane instead of rising from the outside towards the inside, as in the prior art.

Figure 5:
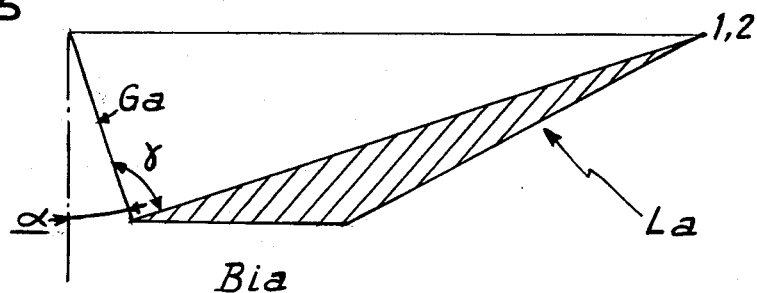
FIG. 5 is a side view of one lobe of this skirt.
Figure 6:
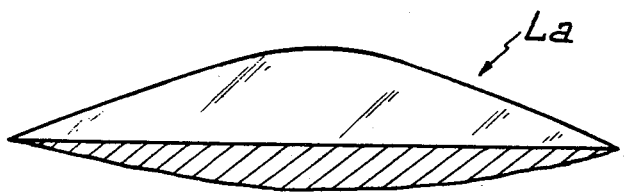
FIG. 6 shows the surface of this lobe when flattened.

In FIGS. 5 and 6, the shaded regions represent the part of a lobe which may be considered as additional with respect to the prior art of French Pat. No. 1,599,638.

FIG. 6 shows a flat view of the lobe $L_a$ of the outer skirt. The invention will be better understood by comparing its shape with that of the prior art (FIG. 2 of French Pat. No. 1,599,638.)

Generally, a lobe such as $L_a$ is characterised particularly by the angle $\alpha$ which its outermost generatrix $G_a$ forms with the vertical, as well as by the angle $\gamma$ which this same generatrix forms with the transverse plane passing through the lower edge of this generatrix and the points 1, 2 at which the ends of the lobe are secured.

The edges of the lobe of the inner skirt are arranged in the same way as those of the outer skirt and they are located in the same horizontal plane. The compartments $c_1$, $c_2$, $c_3$, etc. ... have a bottom perimeter having a constant height $h$ above ground level which constitutes the height of lift and between which and ground level air egresses.

Figure 7:
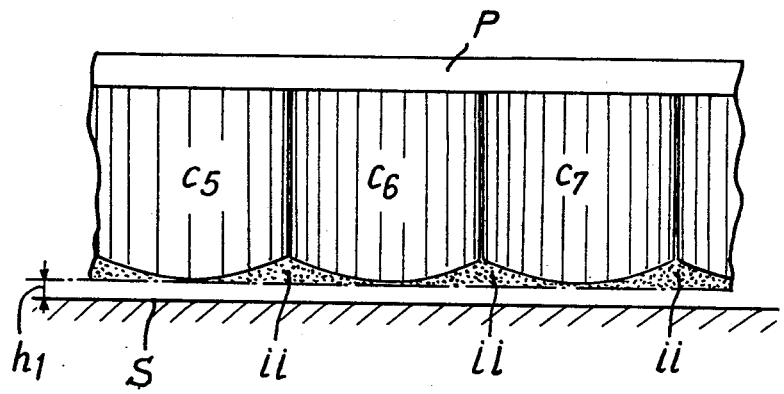
FIG. 7 is a diagrammatic side view of a vehicle comprising multi-lobed skirts of the prior art.
Figure 8:
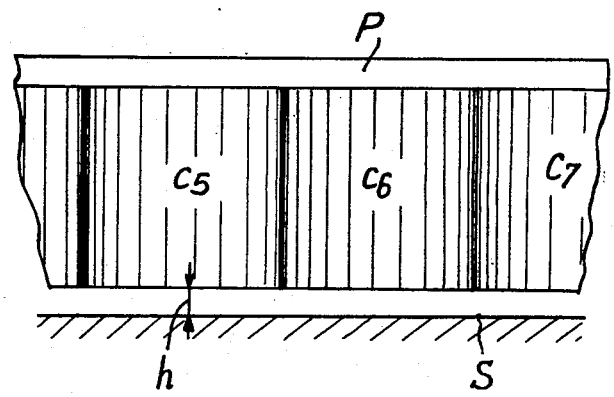
FIG. 8 is a similar view to FIG. 7 of a vehicle according to the present invention.

A comparison of FIGS. 7 and 8 illustrates the difference between the prior art and the invention.

In FIG. 7 (prior art) it can be seen that the perimeter past which air egresses at the bottom of the lobes has a scalloped shape, the air escaping from the outer skirt both through the space corresponding to the height of lift $h_1$ and through the interstitial escape space $ii$ shown in dotted line.

With the embodiment according to the invention (FIG. 8), the bottom perimeter is in a horizontal plane located at a distance $h$ from the ground S. It is through this space $h$ that the air escapes to the outside. It will be seen that with an equal rate of flow at the bottom of the skirts, the height of the lift is maximised ($h$ is greater than $h_1$) with the arrangement of the invention.

This constitutes a prime advantage for the latter, as already explained.

In the same way, transverse connection from one compartment such as $c_5$ to the adjacent compartment such as $c_6$, through the intermediary of interstitial spaces such as $ii$, is appreciably decreased, even eliminated. This makes it possible to increase the stability of the vehicle while facilitating the creation of localised pressure differences between the various adjacent compartments.

As already stated, each lobe may be made from a continuous disc or blank having the shape shown in FIG. 5. It is also possible to use sections of disc connected to cables or pulling angle members.

According to another feature of the invention, the angle of each lobe of the skirts is chosen in dependence on the location of the lobe on the vehicle. For lobes located at the front of the machine, the angle $\alpha$ may advantageously vary between 25° and 15°, for lobes located in the centre of the machine from 18° to 12° and for lobes located at the rear of the machine from 12° to 8°. The angle $\gamma$ is at least equal to 90° for all the lobes fixed to the platform by their upper edges such as $B_{sa}$, $B_{sb}$, $B_{sc}$.

FIGS. 9, 10 and 11 illustrate a modification of the vehicle of FIGS. 1, 2, 3 and the same references have been used to designate parts which remain the same.

According to this modification, there is added to at least certain of the compartments $c_1$, $c_2$, $c_3$, ... an auxiliary tubular skirt $j_1$, $j_2$, $j_3$, ... As shown, these skirts are of frustoconical shape narrowing in downward direction. They are supplied directly from the diffusion chamber D, through the intermediary of the orifices $o_3$ and $o_4$. They may thus have a pressure greater than that of the central cushion C. They are also defined by horizontal lower edges, preferably slightly above the edges constituting the bottom perimeter of the compartments $c_1$, $c_2$, $c_3$, ... If, following local imbalance of the vehicle, the lower edge of the skirts $j$ comes into contact with the ground or the surface of the water, they form closed chambers in which the pressure may rise, thus constituting stabilising members for the vehicle. It is thus possible to dispose the skirts $j$ to the right and left of the vehicle if it is desired to increase rolling stability, or at the front and rear if it is desired to increase pitching stability.

It has been stated that certain figures are only diagrammatic for example, in FIGS. 3 and 11, not all the orifices such as $o_1$, $o_2$, $o_3$, $o_4$, nor the regulating means (for example pivoting valves) which may be associated with these orifices have been shown.

What is claimed is:
1. An air lift vehicle comprising:
a platform,
an inner multilobed skirt depending from said platform and defining a central air cushion region,
an outer multilobed skirt surrounding said inner skirt, each lobe of said outer skirt being paired with one of the lobes of said inner skirt to define a crescent-shaped compartment between them, said crescent-shaped compartment being completely formed by said pair of lobes,
means carried by said platform for providing air under pressure to the central air cushion region and to the crescent-shaped compartments,
each of said lobes being formed by a blank of flexible material bent to define an arcuate central portion and substantially planar side portions, each two adjacent lobes of each skirt being arranged with their arcuate central portions substantially tangent to each other and their adjacent side portions in face-to-face contact,
the lower edge of the arcuate central portion of each outer skirt lobe being horizontal and arranged in the same horizontal plane as the lower edges of the arcuate central portions of all the other outer skirt lobes, and the outer generatrix of each lobe forming an angle $\alpha$ with the vertical, re-entrant from top to bottom, the angle varying according to the location of the lobe on the vehicle and decreasing in magnitude from the front to the rear of the vehicle.

2. A vehicle according to claim 1, in which said generatrix of each lobe forms an angle $\gamma$ at least equal to 90° with the plane passing through its lowest point and through the two innermost suspension points of the lobe.

3. A vehicle according to claim 1, in which at least certain of the cresent-shaped compartments also comprise tubular frustoconical skirts supplied directly from a diffusion chamber and narrowing in a downward direction and terminating in a substantially horizontal edge.

4. A vehicle according to claim 1 in which the lower edge of the arcuate central portion of each inner skirt lobe is horizontal and arranged in the same horizontal plane as the lower edges of the arcuate central portions of all the other inner and outer skirt lobes.

* * * * *